United States Patent
Malley et al.

(10) Patent No.: US 8,500,183 B2
(45) Date of Patent: Aug. 6, 2013

(54) WALL AND ROOF LINER FOR INSTALLATION IN A CARGO VEHICLE

(75) Inventors: Terrence Malley, Moncton (CA); Steen Gunderson, Charles Settlement (CA); Erin Cooke, Moncton (CA); Joseph Laurie Chavarie, Lakeville (CA)

(73) Assignee: Malley Industries, Inc. (CA)

( * ) Notice: Subject to any disclaimer, the term of this patent is extended or adjusted under 35 U.S.C. 154(b) by 0 days.

(21) Appl. No.: 13/295,320

(22) Filed: Nov. 14, 2011

(65) Prior Publication Data

US 2012/0126575 A1      May 24, 2012

Related U.S. Application Data

(60) Provisional application No. 61/416,345, filed on Nov. 23, 2010.

(30) Foreign Application Priority Data

Apr. 27, 2011    (CA) ..................................... 2737968

(51) Int. Cl.
*B60R 11/06*      (2006.01)
*B60P 3/14*      (2006.01)

(52) U.S. Cl.
USPC .......... 296/3; 296/24.32; 296/39.1; 296/37.6; 224/401; 224/542; 224/543

(58) Field of Classification Search
USPC ................... 296/3, 24.32, 24.36, 24.39, 37.1, 296/37.6, 37.13, 39.1; 224/401, 539–544
See application file for complete search history.

(56) References Cited

U.S. PATENT DOCUMENTS

| | | | | |
|---|---|---|---|---|
| 4,453,760 A | * | 6/1984 | Hira | 296/37.13 |
| 6,971,698 B1 | * | 12/2005 | King | 296/37.13 |
| 2005/0001448 A1 | * | 1/2005 | Omori et al. | 296/146.7 |

FOREIGN PATENT DOCUMENTS

EP      0570183 A1    11/1993

* cited by examiner

*Primary Examiner* — Dennis Pedder
(74) *Attorney, Agent, or Firm* — Olson & Cepuritis, Ltd.

(57) ABSTRACT

A wall liner system for installation within the cargo space of a van or other utility vehicle is provided. The system includes an inner panel configured to conform to and contact an inner surface of the vehicle side wall, an outer panel covering the inner panel, at least one article holder on the outer panel for stowing articles, and at least one connector fastening together the holder, the outer panel and the inner panel. The outer panel can be configured to cover and conform to the configuration of wheel wells and other components of the vehicle which protrude into the cargo space. The inner panel can comprise a rigid plate and the outer panel can comprise a less rigid moulded plastic panel, with the connector being configured to transfer substantially all of the weight of the holder onto the more rigid inner panel.

13 Claims, 10 Drawing Sheets

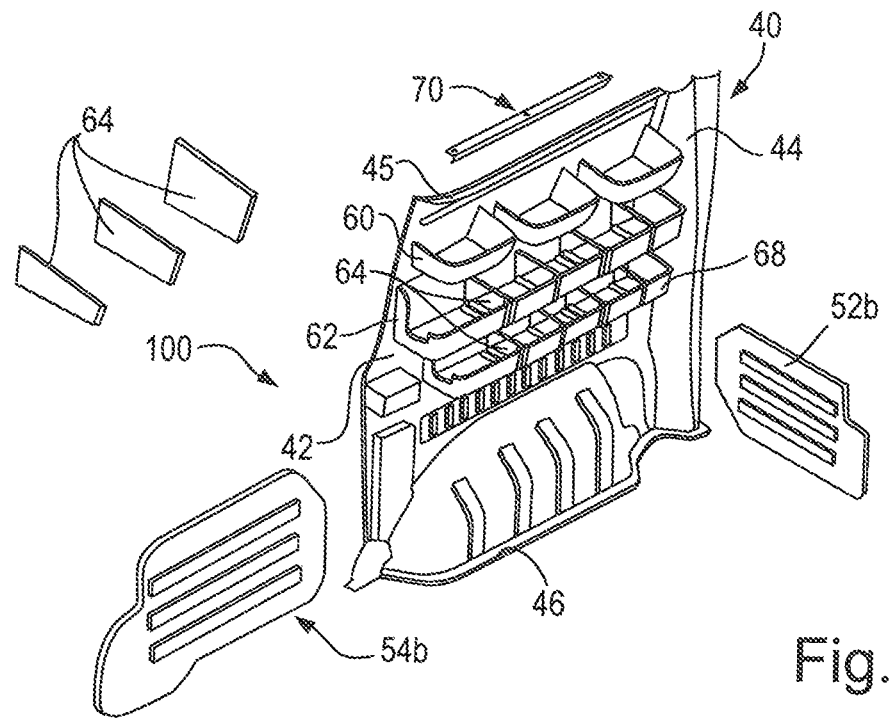
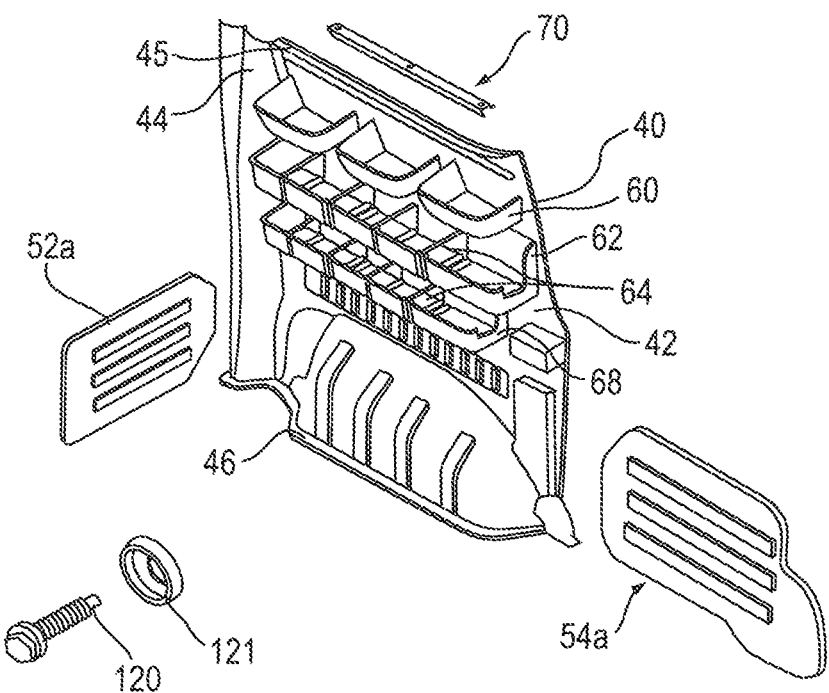
Fig. 6

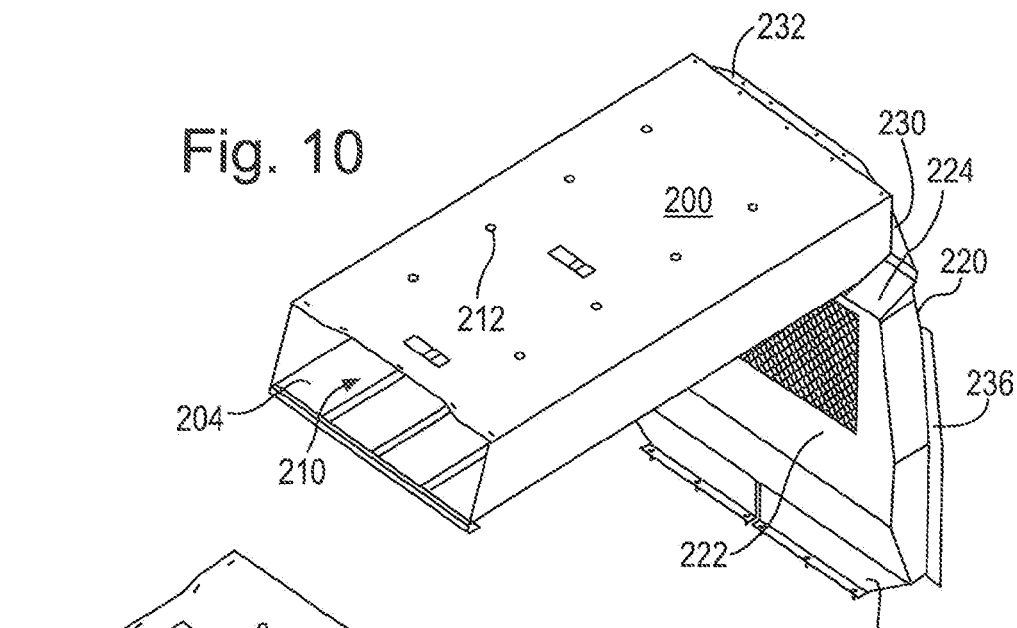
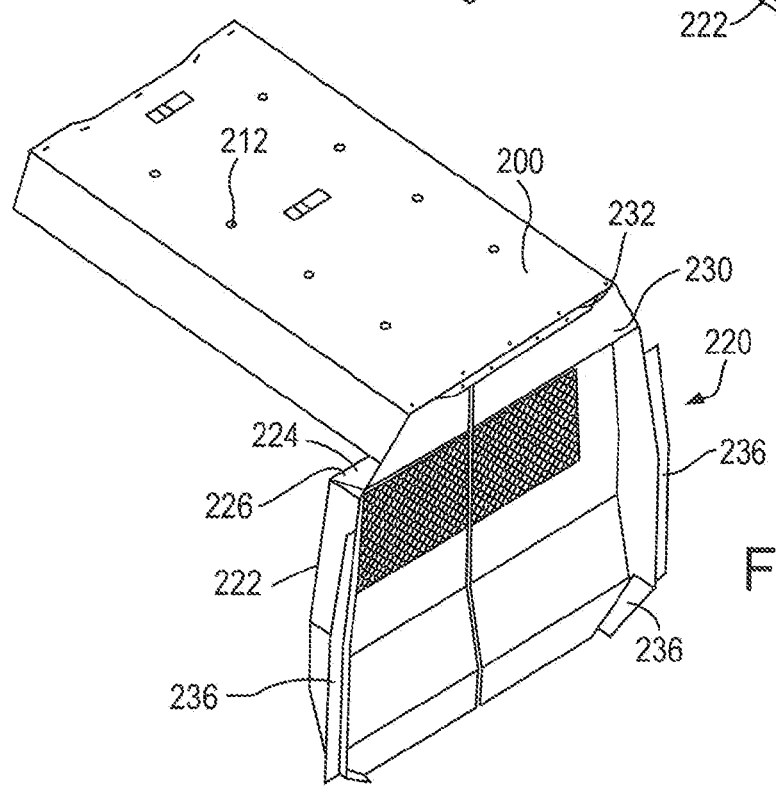

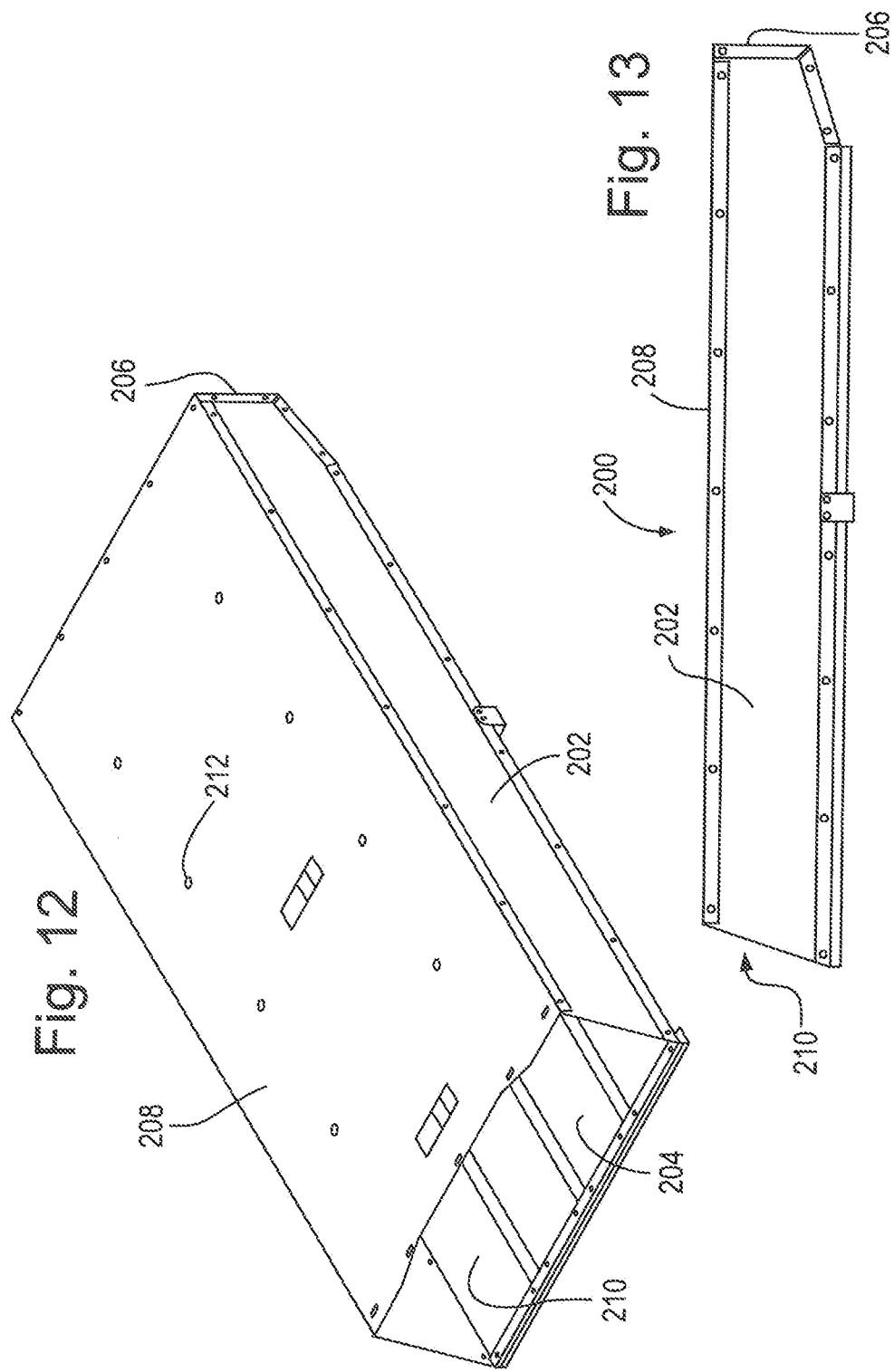

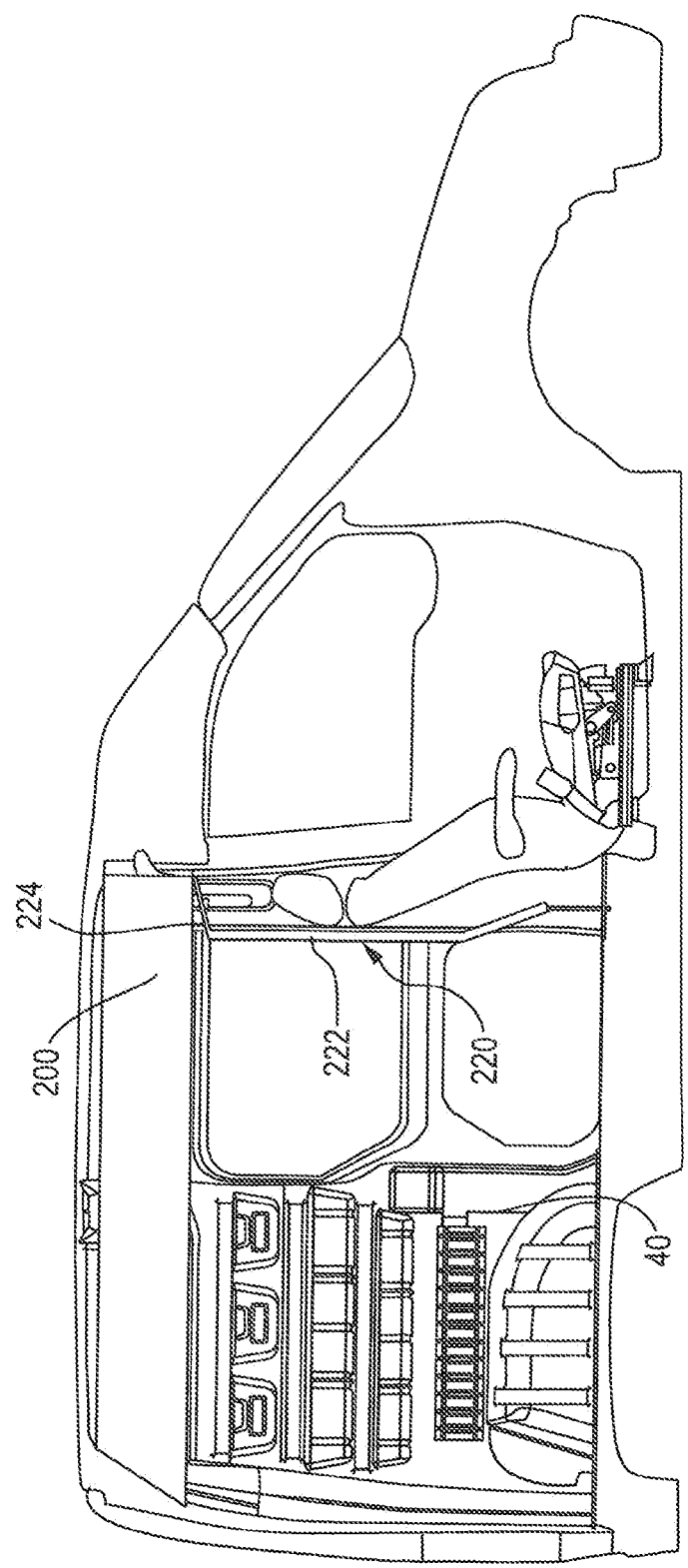

WALL AND ROOF LINER FOR INSTALLATION IN A CARGO VEHICLE

CROSS REFERENCE TO RELATED APPLICATIONS

The present application claims the benefit of U.S. patent application Ser. No. 61/416,345 filed on Nov. 23, 2010 and Canadian Patent Application No. 2,737,968, filed on Apr. 27, 2011. Both of said applications are incorporated herein by reference in their entirety.

FIELD OF THE INVENTION

The present invention relates to accessories for cargo vehicles and in particular to a vehicle wall liner for mounting within the interior space of a van, truck or other cargo vehicle to provide for storage compartments within the vehicle interior. More particularly, the invention relates to a liner for installation in a vehicle having one or more compartments which face into the interior of the vehicle, and which can be mounted to the vehicle sidewall within the cargo space of a vehicle. The invention further relates to an overhead compartment for installation on the interior surface of a vehicle roof for carrying cargo in an overhead position within the vehicle interior.

BACKGROUND OF THE INVENTION

Utility vehicles such as vans, light trucks and others include a cargo space in the rear of the vehicle. In many cases, the vehicle user requires a convenient way to transport tools, spare parts and other relatively small articles in a fashion which permits these to be easily organized and retrieved. As well, when larger articles such as ladders can be carried, these should be transported in a safe and easily accessible fashion. When supplied from the manufacturer, a utility vehicle typically has a fully open cargo space that includes at best minimal interior sub-compartments that can reasonably serve this purpose.

Various after-market storage arrangements and systems have been marketed or proposed for shelving, compartments and other units that can be installed or placed within a vehicle cargo space. Examples of prior art systems include: U.S. Pat. No. Des. 303,647 to Lim; U.K. Patent Application No. 2464214 to Holyoak; and U.S. Pat. No. 5,702,144 to Matsuura et al.

In some prior art systems, a shelving or storage unit intended for installation in a vehicle consists of an assemblage of shelves or compartments supported by a frame, with the components being fastened together by the user with bolts or other fasteners. Such a kit can be cumbersome to assemble and can be subject to loosening of the bolts during use. Existing systems generally consist of essentially vertical structures that can intrude into the vehicle space, and often do not represent an efficient use of the interior space of a vehicle. In addition, at least some prior art systems are supported from below, and bear upon the vehicle floor. This generally requires such systems to be essentially upright and vertical in configuration, which reduces the efficient use of space within the vehicle.

A storage system that is intended for commercial use must be sufficiently robust to stand up to frequent use, including with relatively heavy articles. It is also desirable to provide a system that makes efficient use of the interior space of a vehicle, and which is relatively simple to assemble and install by the user, and which fastens to the vehicle in a reliable and robust fashion.

SUMMARY OF THE INVENTION

According to one aspect, the invention relates to a wall liner for mounting to a vehicle wall within a vehicle cargo space. The vehicle can be conventional, such as a cargo van, and may include one or more vehicle components protruding from the side wall such as one or more of spaced apart vertical pillars, horizontal supports, window and door frames, and a wheel well. The wall liner comprises: an outer panel facing the cargo space interior, an inner panel configured to fit over and conform to the configuration of the side wall, at least one compartment, bin or other article holder for receiving articles, at least one connector to secure the holder to the liner, and at least one fastener to fasten the wall liner to the side wall of the vehicle. The connector is configured to extend from the article holder through the outer panel and into the inner panel to fasten together the article holder, the outer panel and the inner panel. When installed, the holder contacts the outer panel with its weight being substantially borne by the inner panel, which can be relatively rigid and robust compared to the outer panel. For example, the inner panel can comprise a rigid material such as metal, while the outer panel can comprise a mouldable plastic.

The wall liner may be supplied as a kit consisting, in partially or fully unassembled form, of the inner and outer panels, the holders, fasteners for fastening these components together in the manner described herein, and brackets or other mounting members for mounting the assembled cargo liner to the vehicle wall.

In some cases, the inside surface of the sidewall of the vehicle is curved and the inner and outer panels have a curved configuration which conform to the curvature of the sidewall.

The wall liner can be configured to extend between the B and D pillars of the vehicle. Depending on the length of the wall liner, multiple ones of the respective panels can be provided, which are to fit together in end to end fashion. In this fashion, the wall liner can be configured to cover essentially the entire wall within the cargo space of even an extended-length cargo vehicle.

The panels can be configured to conform to various vehicle components protruding from the vehicle wall. For this purpose, the inner panel can be configured to fit between the protruding vehicle components and thereby form an essentially plate-like structure conforming to the inside surface of the vehicle wall. The outer panel comprises a moulded plastic, which fully covers and extends past the edges of the inner panel, and covers and conforms to various vehicle protrusions. The inner and outer panels are discrete members that can be separated from each other, and supplied to the user separately for assembly into the installable wall liner.

In some embodiments, the wall liner is suspended from the vehicle wall with one or more fasteners whereby the weight of the liner is essentially born by the vehicle wall. The liner is thus substantially unsupported from below.

According to another aspect, the invention relates to a method of installing a wall liner to a side wall of a vehicle within an interior cargo space of the vehicle. As above, the vehicle comprises one or more vehicle components protruding from the side wall including one or more of spaced apart vertical pillars, horizontal supports, window and door frames, and a wheel well. The wall liner is as described above. The method comprises the steps of fastening the article holder or holders, the outer panel and the inner panel together with a connector whereby the holder contacts the outer panel and is substantially supported by the inner panel, and suspending the wall liner to the side wall of the vehicle with a liner fastener.

According to another aspect, the invention relates to an overhead storage system for installation within a vehicle interior. The system is configured to hold cargo, for example a combination of up to two six foot step ladders, one multiple-purpose ladder, pipes, lumber or other relatively long objects that normally are carried on a roof rack. The vehicle comprises a cargo space having front and rear ends, a driver seating space located forward of the cargo space and an overhead roof. According to this aspect, the storage system comprises an elongate cargo compartment comprising bottom, side and top walls and an open rear end, and mount means for mounting the compartment to the vehicle ceiling. Preferably, the compartment also has a front wall. The storage system further includes a partition configured for mounting between the cargo space and driver seating space, the partition comprising a generally vertical lower portion and a forwardly stepped upper portion which protrudes into the driver seating space adjacent to the vehicle roof to define a shelf and an overhead space contiguous with the cargo space. The compartment extends into the overhead space and is supported in part by the shelf.

The invention further relates to a method of providing an overhead storage space within a vehicle. The method involves installing the partition as described above between the vehicle cargo space and the driver seating space at a location immediately behind the driver seating space, and mounting a compartment as described above the vehicle ceiling. The compartment is installed to extend into the overhead space provided by the partition, and be supported by the shelf.

The present invention will now be further described by reference to embodiments thereof. It will be understood that the detailed description which follows, including references to particular dimensions, materials and the like, is not intended to limit the scope of the invention, but is rather intended merely to illustrate aspects of the invention. The skilled reader will appreciate that various components, configurations and other specific aspects described or illustrated in detail herein can in general be substituted by other components, configurations or other aspects that are functionally and/or mechanically similar or identical, or in some cases omitted without significantly changing the functioning of the invention or its operation or use.

Terminology used herein is intended to be read in a broad and non-limiting fashion unless otherwise stated. For example, the terms "van" or "vehicle" are intended to include a wide range of vehicles that include an interior space suitable for transporting articles, and in which the liners described herein can be conveniently installed. The term "panel" used herein is intended to broadly describe any relatively thin-walled structure, howsoever configured, and is not limited to a flat or planar structure. The term "liner" is used broadly herein to refer to a structure which can be installed on the inside surface of a vehicle panel such as the wall or roof panel of the vehicle. The terms "mounts", "mounting means" and the like are intended to encompass any suitable means to mount an object to a vehicle, such as bolts or other known fasteners. Persons skilled in the art will understand that there exist a wide variety of such means, which would be suitable for use with the present invention.

BRIEF DESCRIPTION OF THE DRAWINGS

FIG. 6 is an exploded view, in perspective, of components of the wall liner.

FIG. 10 is a perspective view of an overhead storage compartment and vehicle cargo partition as described below.

FIG. 11 is a further perspective view of the overhead compartment and partition.

FIG. 12 is a perspective view of the overhead compartment of FIG. 10.

FIG. 13 is a side elevational view of the overhead compartment of FIG. 10.

FIG. 14 is a side elevational view of a portion of a cargo van, partly in section, showing the wall liner and overhead compartment installed therein.

DETAILED DESCRIPTION

Figure 1:
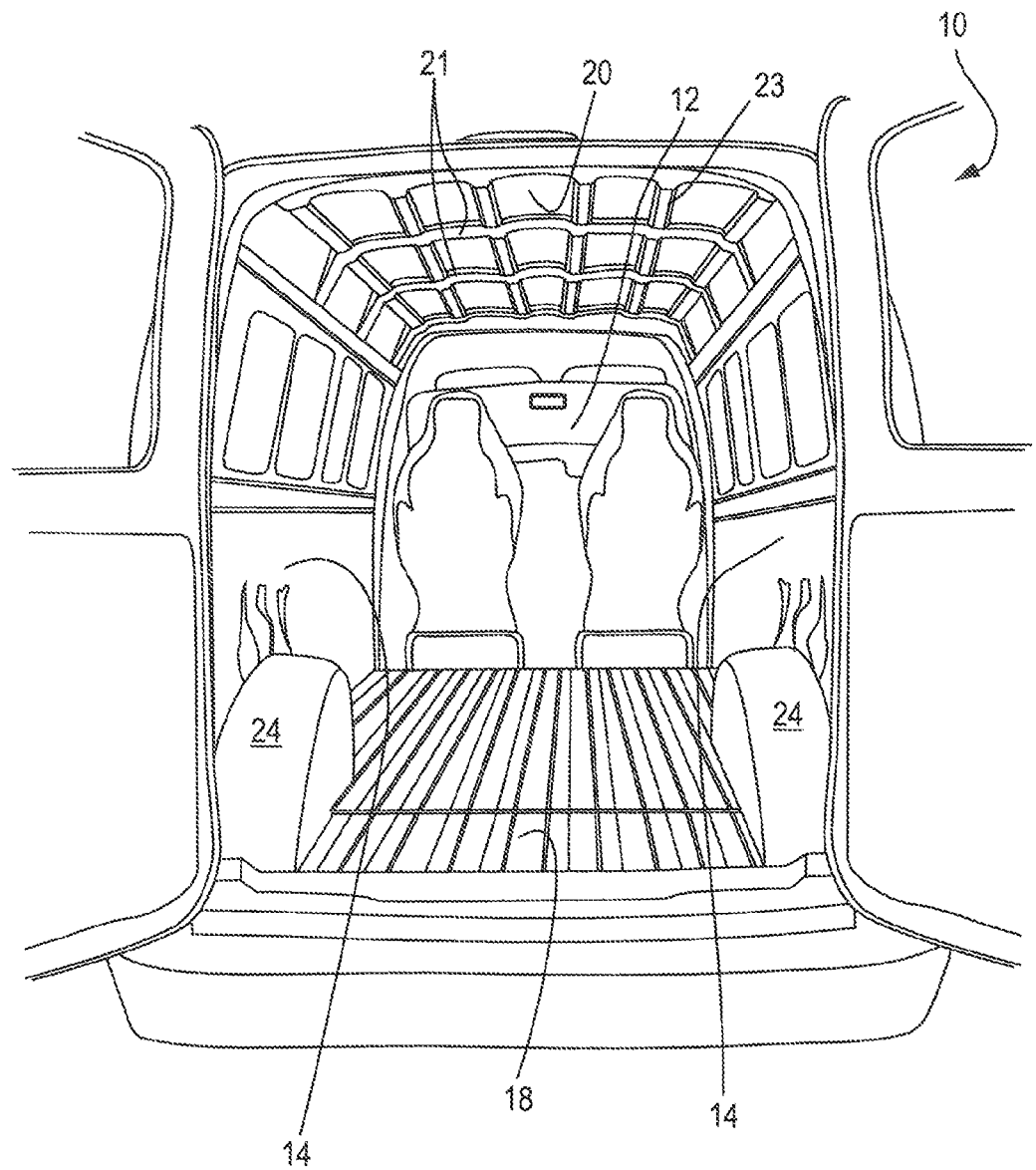
FIG. 1 is a perspective view, from the rear, of a conventional cargo van.
Figure 2:
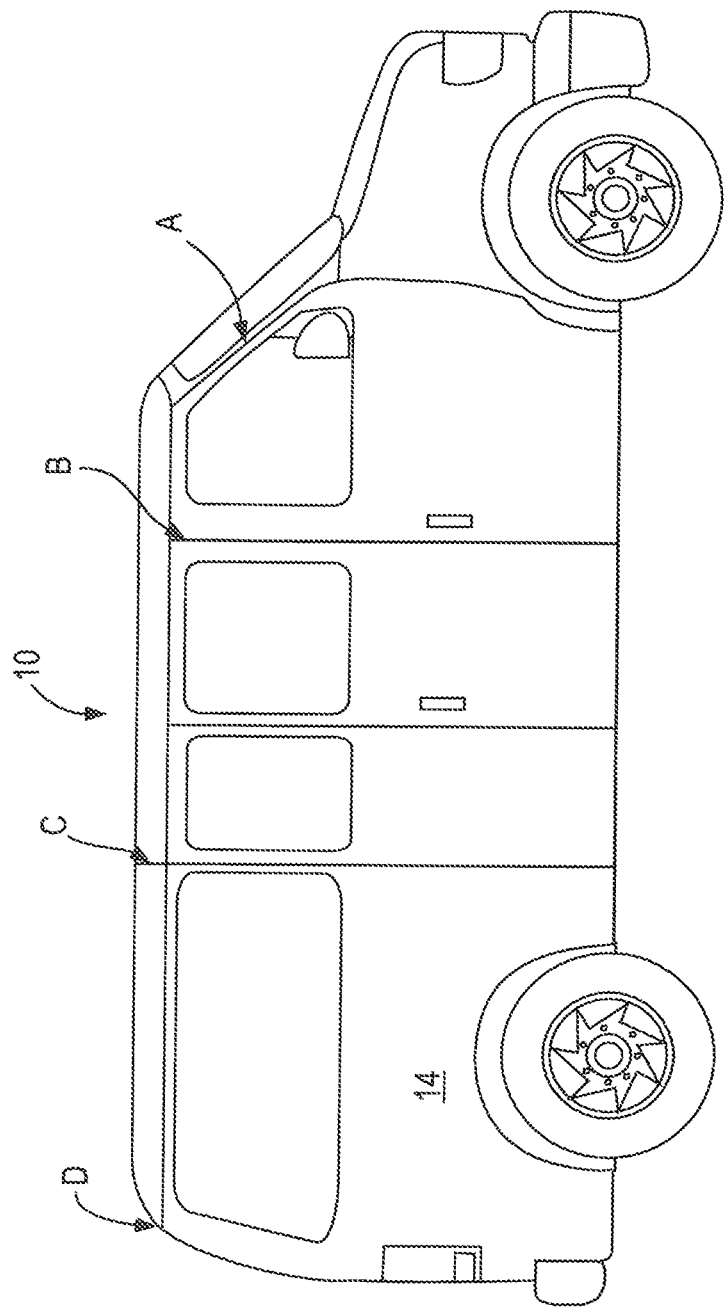
FIG. 2 is a side view of the exterior of a cargo van, illustrating the location of the support pillars A through D.

Turning to FIGS. 1 and 2, a conventional cargo van or other vehicle 10 includes an interior cargo space 12. Typically, cargo space 12 consists of the interior space located behind the front vehicle seats, and which is normally dedicated to transporting cargo, tools, equipment and the like for commercial uses. Vehicle 10 includes side walls 14, the interior surfaces of which face cargo space 12 and define the sides of the cargo space. Cargo space 12 is further defined by vehicle floor 18 and ceiling 20. Transverse and longitudinal roof ribs 21 and 23 respectively traverse ceiling 20 to form a grid pattern. Ceiling 20 may be covered with an interior head liner panel, or uncovered to expose ribs 21. Side walls 14 comprise curved sheet metal panels which in most cases bow outwardly from the vehicle. Depending on the vehicle, the degree of curvature of walls 14 can vary from a significant curvature to essentially or fully planar. As seen in FIG. 2, vehicle walls 14 include vertical pillars, consisting of the B-pillar (pillar "B") located directly rearward of the cab doors, the C-pillar (pillar "C") located rearwardly of the B pillar, and the D Pillar (pillar "D"), located adjacent to the rearmost corner of the vehicle. The C-Pillar is only present if the corresponding vehicle side wall includes a side cargo door. If a side cargo door is not present, the C-pillar may be replaced with a half-post located on the upper portion of the side wall at the location directly adjacent to the C-pillar on the opposite wall, or at a location directly behind a rear side window, if no side doors are present. Pillars B-D usually protrude into the vehicle interior from the inside surface of side walls 14, in particular when the vehicle does not include the interior liner panels that are usually provided in a passenger-type vehicle. Wall 14 may optionally comprise an interior panel or covering such as a plastic liner, spaced from wall 14 and which forms the entirety of the interior surface of wall 14. Alternatively or in addition, removable or fixed coverings may be provided to cover specific components or elements associated with side walls 14 or other elements within cargo space 12. For example, a removable panel may be provided to access exterior lights or other electrical or mechanical components from the vehicle interior.

Side walls 14 also comprise inwardly-protruding wheel wells 24. Optionally, one or more windows may be provided through one or both of side walls 14. Walls 14 may also comprise specific features and configurations to accommodate other specific components or elements of the vehicle that may protrude into the interior, such as components of the exterior lights, fuel filling components and the like. Typically, the primary access to cargo space 12 is via rear doors, and in some cases one or more sliding side doors are provided.

Turning to FIGS. 3-9, the present wall liner 100 is typically supplied in the form of a kit consisting of one or more moulded liner panels 40, mounting hardware, reinforcement plates 41, trim and other components, as will be described in more detail below. Wall liner 100 may be supplied in unassembled kit form, for assembly and fitting to a vehicle by the user.

Panels 40 form the outer, exposed portion of wall liner 100 facing the vehicle interior, and can cover a substantial surface of side wall 14. Panels 40 are each configured to fit in a selected, specific location lining the inside faces of side walls 14 within interior space 12. As will be described below, various combinations of storage compartments, article hangers and other useful article retaining components project from panels 40, as will be described below. Panels 40 are fabricated from a rigid moulded plastic such as vacuum forming grade ABS. Typically, liner kit 100 comprises a plurality of panels 40, although a single panel may be provided if desired.

Figure 7:
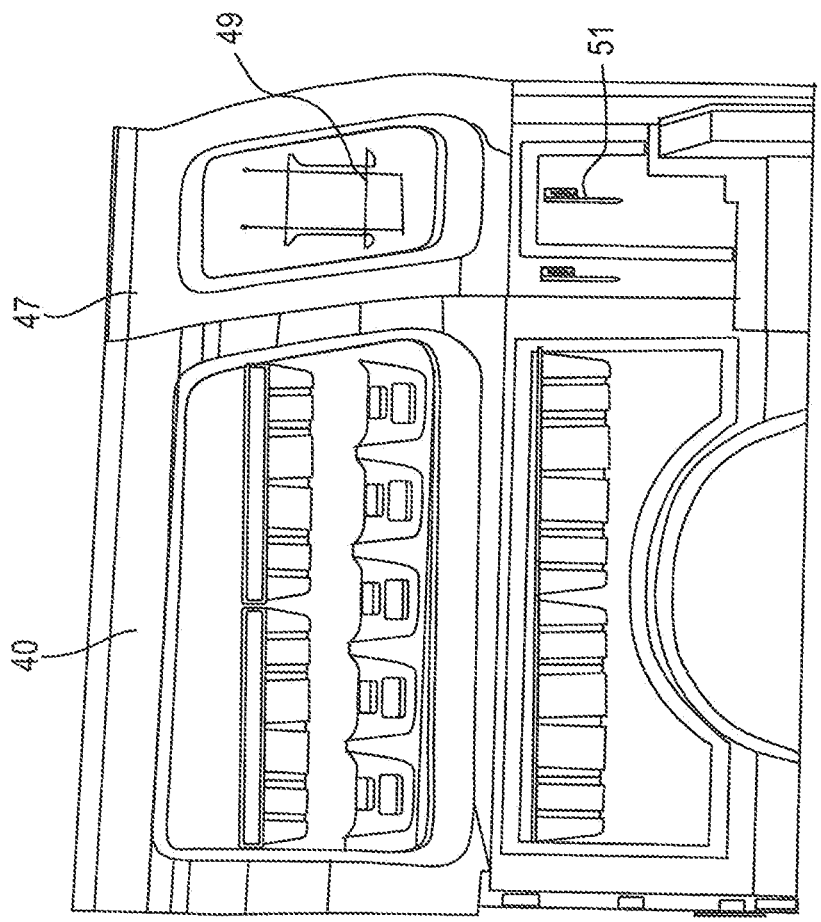
FIG. 7 is a side elevational view of an alternative embodiment of the wall liner.
Figure 8:
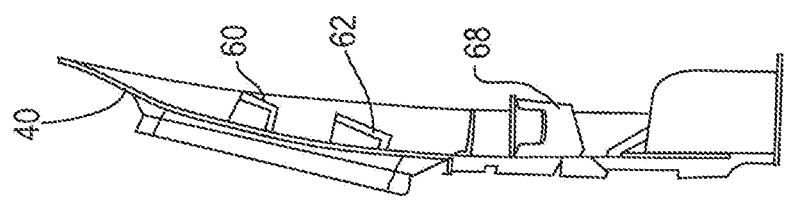
FIG. 8 is an end-on view of the wall liner of FIG. 7.
Figure 9:
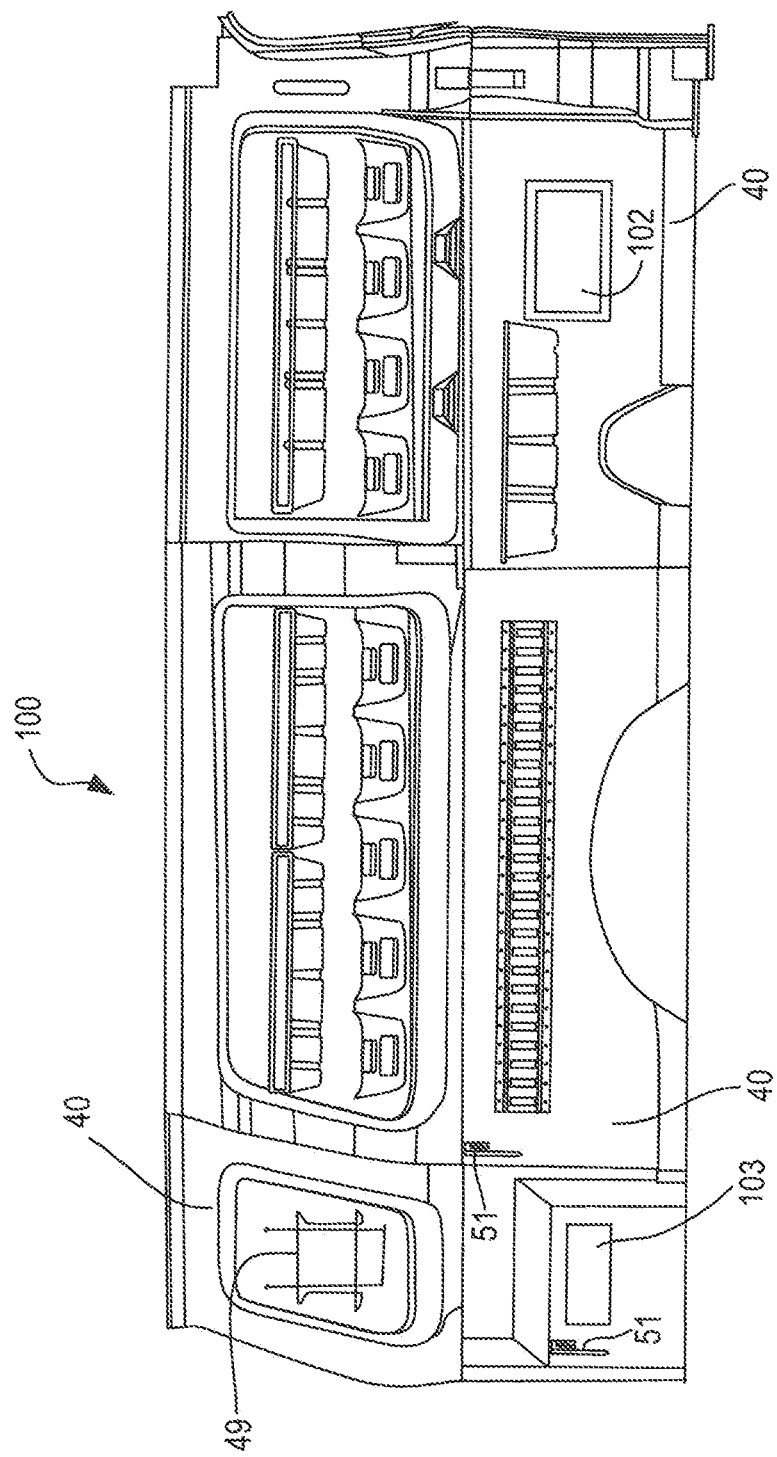
FIG. 9 is a side elevational view of a further embodiment of the wall liner.
Figure 15:
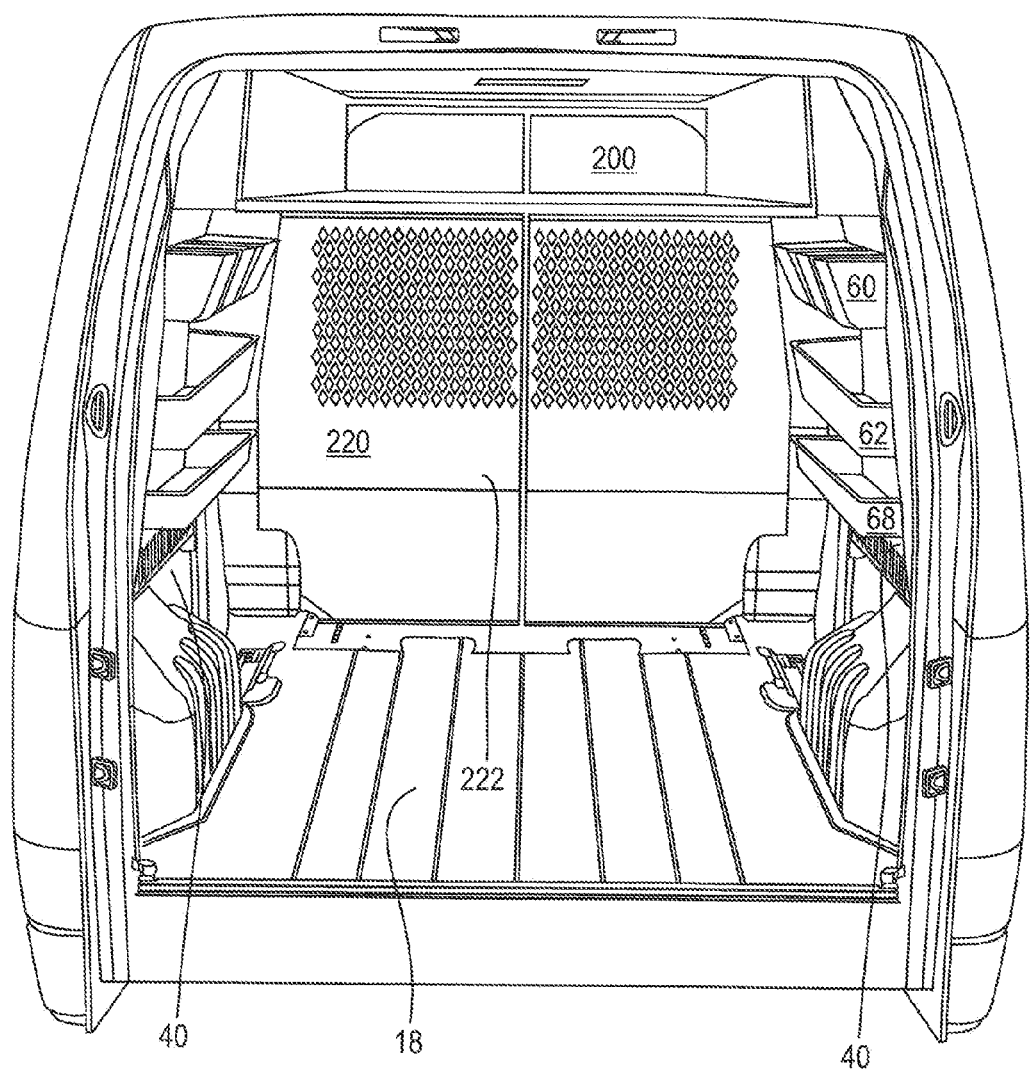
FIG. 15 is a rear elevational view showing the elements of FIG. 14.

As seen more particularly in FIG. 6, panel 40 can be configured for installation on either of the driver or passenger side of the vehicle. As seen in FIGS. 7 and 9, various combinations of panels 40 can be provided to line any selected portion of vehicle wall 14. The number and configurations of panels 40 will depend on the overall size of the liner, which in turn is limited by the size of vehicle 10, and the particular configuration of vehicle wall 14 and any vehicle components which protrude from wall 14 into the interior cargo space 12. The provision of multiple sections of the wall liner is easier to manufacture, handle and install than a single large panel covering the entire wall surface. The panels 40 on opposing sides of the vehicle can be substantially mirror images of each other, in particular when the respective sides of the vehicle are identical (for example, both sides of the vehicle have an identical side door or no side door). Alternatively, panels 40 for installation on opposing sides of the vehicle can differ in configuration to accommodate different structural configurations of the respective sides of the vehicle, such as a door being located solely on one side of the vehicle. As well, as discussed below, kit 100 can be supplied with panels 40 that differ in the configurations of compartments and other fittings attached to or structured within the respective panels. As will be apparent, the configuration and overall length of each panel can vary considerably depending on the vehicle it is designed to fit.

Panels 40 extend substantially the full height of vehicle wall 14, although it is also contemplated that one or more of the panels may extend only partially this height. Panels 40 are configured to conform substantially to the configuration of the inside surface of wall 14. For this purpose, panels 40 are curved in the vertical plane to substantially follow the curvature of wall 14. Panels 40 also include portions that are configured to conform to various protruding vehicle components within the vehicle interior, such as wheel wells 24, pillars and other such protruding elements of the vehicle. Between such portions, panels 40 comprise recessed portions 42 which conform to the inside surfaces of vehicle walls 14, and which are recessed relative to protruding portions of the panels 40 which fit over wheel wells, pillars and other protruding vehicle elements.

Panels 40 further comprise side, upper and lower edge portions 44, 45 and 46, respectively, which provide a flush, finished appearance with the interior surface of cargo space 12 when panels 40 are installed in the vehicle. To the extent possible, edge portions 44, 45 and 46 are configured to closely match the configuration of the adjoining exposed vehicle wall surfaces.

Figure 5:
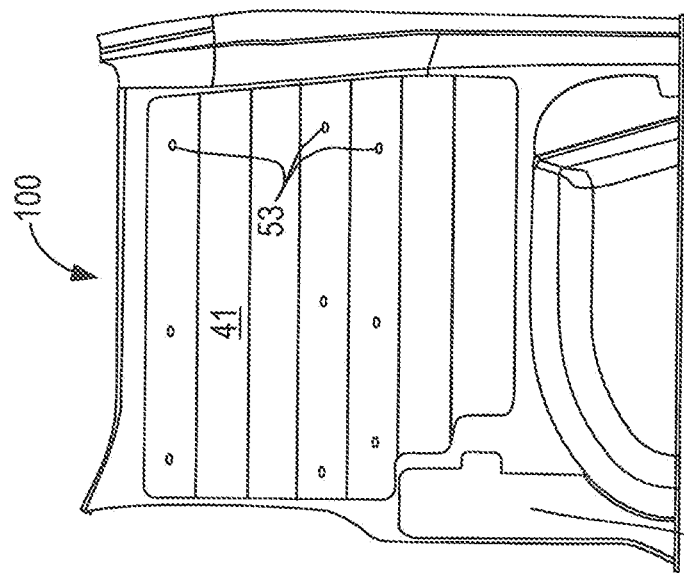
FIG. 5 is a side elevational view opposed to FIG. 3, showing in particular the inner support panel.
Figure 4:
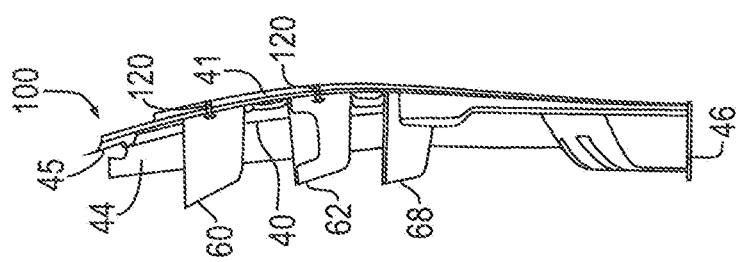
FIG. 4 is an end-on view of the wall liner.
Figure 3:
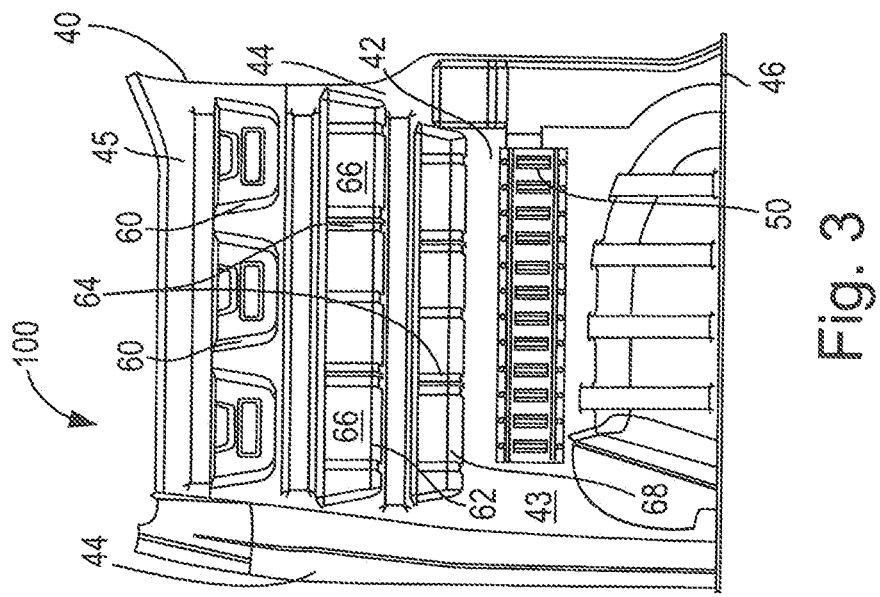
FIG. 3 is a side elevational view of a first embodiment of a wall liner according to the present invention, showing the exposed outer panel and cargo stowage compartments thereof.

As seen in FIGS. 4 and 5, panels 40 each comprise an inside surface facing the vehicle side wall 14, and an exposed outside surface, facing the vehicle interior. The inside surface of portion 42 is partially, substantially or fully covered with a reinforcement plate 41, which provides structural rigidity and support to panels 40. Reinforcement plate 41 is preferably fabricated from aluminum or other metal, but may comprise any suitably rigid and robust material, such as certain plastics. Reinforcement plate 41 has a curved configuration which substantially conforms to the corresponding portion of the vehicle wall to which it is mounted. Reinforcement plate 41 includes through-openings 53 for receiving fasteners, in order to permit plate 41 to be fastened to the corresponding panel 40, as well as to permit fastening of storage compartments to wall liner 100 in a fashion that permits the weight of the compartments to be borne largely by plate 41, as will be discussed below. In use, panels 40 and plates 41 may be supplied in a pre-assembled form, or alternatively panels 40 may be fastened to reinforcement plates 41 by the user. Panels 40 may be supplied with pre-drilled holes which align with corresponding holes in reinforcement plate 41, to permit fastening of these components by bolts, rivets or other fasteners.

One or more of panels 40 may include a track 50 (F*ig*. 3) mounted thereto which includes an array of anchors that serve as attachment points for various purpose such as for attaching tie down straps or other for securing cargo. Cargo-carrying elements such as racks 49 and 51 (FIGS. 7 and 9) can be provided to carry such articles as helmets and other loose and/or somewhat bulky articles.

Panels 40 are configured to accommodate the configuration and features of the inside wall surfaces of any selected vehicle. For example, the Ford Transit Connect vans (as well as other vehicle models) are provided with cargo tie-down rings within the van interior; in one embodiment, wall liner 100 is configured to expose such cargo rings to permit their use as anchors for securing cargo.

Wall liner 100 may incorporate one or more openable hatches 102 to access to a vehicle component (such as an electrical panel or the like) which is otherwise covered by the cargo liner. Wall liner 100 may also incorporate access openings 103 to provide access to vehicle lamps, from the vehicle interior.

Wall liner 100 may further comprise additional panels which serve to cover other portions of the vehicle interior. Such additional panels (FIG. 6) may consist of rear door panels 52*a* and 52*b* (driver and passenger side) and side door panels 54*a* and 54*b* (driver and passenger side). Most vehicle doors are equipped from the vehicle manufacturer with fiberboard panels attached using christmas tree plugs. Vehicles not equipped with fiberboard Panels generally are provided with mounting locations for such panels. Panels 52 and 54 are configured to mimic the shape of the OEM door panels and fit within the contours of the OEM door. Panels 52 and 54 include holes (not shown) located to line up with all or some of the OEM door panel holes, to the extent required for secure fastening. Panels 52 and 54 are intended to cover exposed wall cavities and generally do not comprise structural elements, and may be attached using plastic christmas tree plugs (not shown).

Wall liner 100 further comprises an array of bins or other holders which may be used to retain a variety of articles. Suitable holders include a wide range of members for stowing articles such that the stowed articles can be readily accessed by the user, such as open or closed compartments, solid or mesh bins, shelves, hooks, cups, anchors and the like. Typically, these components can be arranged in several tiers on liner 100. For example, an uppermost tier may comprise several spaced apart relatively deep bins 60, for holding larger articles. A middle tier may comprise an elongate trough-shaped bin 62 extending substantially the width of panel 40. Bin 62 may be subdivided by internal dividers 64 into a plurality of sub-compartments 66. A lowermost tier may comprise a bin 68 similar to the middle tier, with similar internal dividers 64. Any number of configurations and arrangement of compartments, bins or other holders may be provided, either in a pre-configured form supplied by the manufacturer, or configured by the user in response to their particular requirements.

Bins 60, 62 and 68 may be supplied pre-fastened to panels 40 by the manufacturer. Alternatively, cargo liner may be supplied as a kit in which the bins are assembled to the panels by the user, thereby permitting more flexibility in terms of positioning of the bins. Bins 60, 62 and 68 are engaged to underlying reinforcing plates 41, with panels 40 being effectively sandwiched between reinforcing plate 41 and the bins. This arrangement results in the majority or entirety of the weight carried by the bins being transferred onto the underlying reinforcing plate, thereby permitting the compartments to carry a substantial load without damage to the plastic panels 40.

In one assembly method, wall liner 100 is supplied as a kit comprising reinforcement plate 41, panels 40 and bins 60, 62 and 68 in an unassembled form. Initially, reinforcement plate 41 is aligned on the panel 40 though the use of locator holes within both of panel 40 and plate 41. Panel 40 and plate 41 are then clamped together in this aligned position, such that plate 41 overlies panel 40. Through-holes 53 within plate 41 then serve as a template for drilling holes in the panel 40. Through-holes 53 are provided in positions which permit the bins to be fastened to liner 100 in a variety of useful locations. The above drilling procedure may be performed by the customer, or alternatively panels 40 may be supplied in a pre-drilled state. Bins 60-68 are then fastened to panels 40 and 41, using pre-drilled holes within the bin walls. For installation of the bins to wall liner 100, bolts 120 or other similar fastening members are passed through the respective aligned openings in the bins, panel 40 and reinforcement plate 41, effectively forming a sandwich of these three components, and then fastening all of these components together. Washers 121 may be provided to distribute the force applied by bolts 120. Typically, bins 60, 62 and 68 are secured using a bolt, a washer, a cap nut (not shown) and thread locking compound, with the cap nut located on the exterior face of plate 41, facing the vehicle exterior.

The configuration, size and number of bins 60, 62 and 68 can be selected to provide the optimal balance of usefulness and practicality. The depth of these bins should be selected to minimize their intrusion into vehicle space 12, so as to maintain good driver visibility to the rear. In this regard, the outward curvature of panels 40 provides an efficient means to provide relatively deep bins with minimal obstruction of the driver's view.

Wall liner 100 is configured to fasten to the vehicle using existing OEM holes in the vehicle whenever possible. In some cases, the existing OEM holes may need to be enlarged to accommodate reinforcing members such as plus nuts or mono bolts. For installation of panels 40, any inside panelling in the vehicle is removed to expose the inside surface of the vehicle side wall 14. Any removable panels or covers mounted to side wall 14 are removed, such as panels which shield the interior components of exterior lights, door lock components and the like. As well, any weather stripping should be removed from the door frames in order to allow installation of panels 40 into a position which abuts the door frame. Following installation of panels 40, the weather stripping is re-installed. Mounting bracket 70 is then fastened to side wall 14, at a location adjacent to ceiling 20. Bracket 70 is an elongate aluminum extrusion having L-shaped profile, with opens to accept screws or other fasteners to securely fasten bracket 70 to wall 14. In order to ensure proper alignment and positioning of bracket 70, a center hole in bracket 70 is aligned with the Christmas tree plug located on the headliner of a conventional cargo van. In the case of other vehicles, other suitable alignment indicia are provided. Panel 40 is then fastened to bracket 70, for example with rivets that are passed through aligned openings in panel 40 and bracket 70. When bracket 70 is properly installed in an aligned position, panels 40 will be aligned between pillars B and D and any window posts in between. In another configuration with a side cargo door, one or more panels 40 (with associated plates 41 and compartments 60,62 and/or 68) can be mounted between pillars C and D. Wall liner 100 can also be fastened directly to vehicle wall 14 by means of screws or other fasteners.

When installed, the weight of wall liner 100 is substantially suspended from the vehicle wall, with no weight, or only a minimal portion of the weight, bearing on the vehicle floor.

Some or all of the OEM liners and covers within cargo space 12 may need to be removed prior to installation, in order to permit the cargo liner to fit tightly against wall 14 of the vehicle. However, in some cases existing liners and covers can remain in place. As well, cargo liner 100 can be supplied with one or more removable hatches or access panels to provide access to vehicle components or accessories that underlie the cargo liner. For example, an access panel may be located to allow access to the vehicle jack or to permit replacement of vehicle lights from the vehicle interior.

In order to provide wall liners 100 that fit a range of vehicles, the configurations of a range of cargo vehicles are determined. Moulds are created for multiple configurations of panels 40 to fit a number of vehicles. As well, a range of configurations and sizes of bins 60-68 can be produced to permit the user with a range of options for bin layouts based individual requirements.

FIG. 9 shows an embodiment of wall liner 100 is composed of multiple panels 40 that form sections lining the side wall of a relatively long cargo van.

FIGS. 10-15 show an overhead storage compartment 200 for mounting to vehicle ceiling 20 within cargo space 12. Compartment 200 is configured to hold relatively long objects such as ladders, lumber, pipes and the like, such that these objects can be transported inside the van interior rather than on a roof rack. According to this embodiment, compartment 200 is essentially box-like, comprising side walls 202, a floor 204 a front wall 206 and a top 208. Floor 204 can be ribbed for improved rigidity. The rear of compartment 200 is open to permit access to the interior thereof. The user can slide ladders or other articles into compartment 200 from the open rear end 210, which may be accessed from the rear door opening of the van when the doors are open. Compartment 200 may be fabricated from any suitable rigid material such as moulded plastic or sheet metal. Compartment 200 is suitably dimensioned to retain a combination of up to two stepladders, a multi-ladder and additional oversized cargo. Top 210 is provided with through-openings 212 to permit fastening of compartment 200 to the vehicle ceiling by suitable fasteners such as bolts.

Optionally, as seen in FIGS. 10 and 11, a vehicle partition 220 is provided for use with overhead compartment 200. In some jurisdictions, safety standards define an Upper Interior Head Impact Protection zone, which prevents objects from being mounted directly about a drivers head. The provision of partition 220 can in some jurisdictions allow overhead compartment 200 to protrude into this zone to maximize the length of compartment 200. Partition 220 also provides a convenient partition between cargo space 12 and the forward driver's compartment. Partition 220 may comprise a mesh body to permit visibility, such as a perforated steel or aluminum (or other suitable material) plate that provides sufficient strength to minimize the risk of penetration by loose articles in the event of an accident. Partition 220 comprises a lower region 222 which extends from the vehicle floor 18, to a point above the vehicle seats. Region 222 terminates at a forwardly-protruding shoulder 224, which protrudes partially into the driver's compartment of the vehicle. The upper surface 226 of shoulder 224 forms a platform which partially supports the front end of compartment 200. The depth of shoulder 224 is selected based on the vehicle dimensions and the desired length of compartment 200.

By way of one example, compartment 200 is configured for installation in the Ford Transit Connect™ van. In order to accommodate a 6 foot step ladder, overhead compartment 200 protrudes 2" into the Upper Interior Head Impact Protection zone. Shoulder 224 is 7.58 inches (192.53 mm) in depth to minimize interfering with the driver or passenger's safety, comfort or visibility. In other cases where the required length of overhead compartment 200 may not require penetrating into the Upper Interior Head Impact Protection zone, there would be no need to install a partition. In such a case, a bracket would be attached to front wall 206, and wall 206 would be bolted to the roof cross bar, directly behind the driver's seat.

Shoulder 220 terminates at its forward end in a wall 230, which extends to the vehicle ceiling. Compartment 200 preferably includes a separate front wall 206 which abuts wall 230 to provide two forward layers to compartment 200 so as to minimize the risk of a loose article intruding into the driver compartment in the event of an accident or sudden stop. The upper edge of wall 230 includes through openings for attaching front face 206 to partition 220. Upper edge 230 terminates in a flange 232, which includes through openings for attaching partition 220 to the vehicle roof. Partition 220 further comprises flanges 236 on its side and lower edges, to permit attachment to the vehicle by bolts or other suitable mounting means.

The detailed description set out above, and in the accompanying drawings, represents an example of the present invention. This description is not intended to limit the scope of the invention, which will be understood to include modifications, variants, substitutions and equivalents of and to the elements and features described above. As well, not all elements and features described above are essential to the invention, and additional features and elements may be added while still remaining within the scope of the invention. The skilled person will thus recognize that the present invention includes numerous modifications, variants, substitutions and equivalents of and to the elements and features described herein.

What is claimed is:

1. A wall liner for mounting in a vehicle, said vehicle comprising opposed side walls and an interior cargo space, said wall liner being mountable within said interior cargo space, said mountable wall liner comprising: an inner panel configured to conform to and contact an inner surface of said side wall, an outer panel covering the inner panel, at least one article holder on the outer panel for stowing articles, and at least one connector configured to extend from the article holder through the outer panel and into the inner panel to fasten together said holder, said outer panel and said inner panel, wherein said inner and outer panels comprise discrete members separable from each other, and wherein weight associated with any stowed articles is borne substantially by the inner panel and wherein said wall liner comprises a plurality of said inner and outer panels, configured for installation in end to end abutting relationship in said vehicle.

2. The wall liner of claim 1 wherein the vehicle comprises members protruding into the cargo space from said side wall including one or more of a pillar, a horizontal support, a window or door frame and a wheel well, and said outer panel is configured to cover and conform to the configuration of said members.

3. The wall liner of claim 1 wherein said inner panel comprises a rigid plate and the outer panel comprises a moulded plastic panel.

4. The wall liner of claim 1 wherein said connector is configured to transfer substantially all of the weight of the holder onto said inner panel.

5. The wall liner of claim 1 wherein the inside surface of said vehicle side wall is curved and said inner and outer panels each have a curved configuration which conforms to the curvature of said sidewall.

6. The wall liner of claim 1 wherein said outer panel comprises an array of through-openings arranged to receive a plurality of said connectors for securing a plurality of said holders to the wall liner.

7. The wall liner of claim 1 configured to extend the full length of said cargo space between B and D pillars of said vehicle.

8. The wall liner of claim 1 wherein said at least one holder comprises any combination of bins, racks and dividers, supplied as a kit for assembly to the outer panel in a selected configuration.

9. The wall liner of claim 1 further comprising a mounting bracket for mounting said wall liner in said vehicle, wherein said mounting bracket substantially suspends said wall liner from said vehicle side wall.

10. A method of installing a wall liner to a side wall of a vehicle within an interior cargo space of said vehicle, said wall liner comprising the wall liner of claim 1, said method comprising the steps of connecting said holder, said outer panel and said inner panel together with at least one of said connectors whereby said holder contacts said outer panel and is substantially supported by said inner panel, and suspending said wall liner to the side wall of said vehicle with at least one of said fasteners.

11. The method of claim 10 wherein said wall liner is configured and installed to substantially cover the inside surface of said sidewall within said cargo space.

12. The wall liner of claim 1 further comprising a track on said outer panel for attaching or securing cargo.

13. A wall liner for mounting in a vehicle, said vehicle comprising opposed side walls and an interior cargo space, said wall liner being mountable in said interior cargo space, said mountable wall liner comprising: an inner panel configured to conform to and contact an inner surface of said side wall, an outer panel covering the inner panel, at least one article holder on the outer panel for stowing articles, and at least one connector configured to extend from the article holder through the outer panel and into the inner panel to fasten together said holder, said outer panel and said inner panel, wherein said inner and outer panels comprise discrete members separable from each other wherein weight associated with any stowed articles is borne substantially by the inner panel and wherein said wall liner is configured to extend the full length of said cargo space between B and D pillars of said vehicle.

* * * * *